United States Patent [19]
Stephens

[11] 3,929,258
[45] Dec. 30, 1975

[54] FLUID DISPENSING STRUCTURES

[75] Inventor: James B. Stephens, La Crescenta, Calif.

[73] Assignee: Westates Space-Era Products, Inc., So. El Monte, Calif.

[22] Filed: July 29, 1974

[21] Appl. No.: 492,488

[52] U.S. Cl. .................. 222/1; 222/150; 222/495; 239/118; 239/542
[51] Int. Cl.² .......................................... B05B 15/00
[58] Field of Search.................... 239/118, 542, 534; 222/149, 150, 151, 544, 495, 485, 148, 496

[56] References Cited
UNITED STATES PATENTS

| 2,765,958 | 10/1956 | Betts, Jr. | 222/150 |
| 2,771,320 | 11/1956 | Korowin | 239/534 X |
| 3,827,638 | 8/1974 | Halvorsen | 239/534 |

Primary Examiner—Stanley H. Tollberg
Assistant Examiner—Hadd Lane
Attorney, Agent, or Firm—Edward D. O'Brian

[57] ABSTRACT

A fluid dispensing structure intended primarily for use in drip or trickle type irrigation of plants can be constructed utilizing an elongated conduit having a plurality of holes located along its length. A flow control member is associated with each of the holes. These flow control members permit flow through their associated holes when a fluid is supplied to the interior of the conduit. Preferably the conduit is formed of a flexible material and the flow control members are constructed so as to permit relative motion between the holes and their associated flow control members in accordance with the internal pressure within the conduit. Such a preferred structure is relatively self-cleaning in character.

21 Claims, 6 Drawing Figures

U.S. Patent    Dec. 30, 1975    Sheet 1 of 3    3,929,258
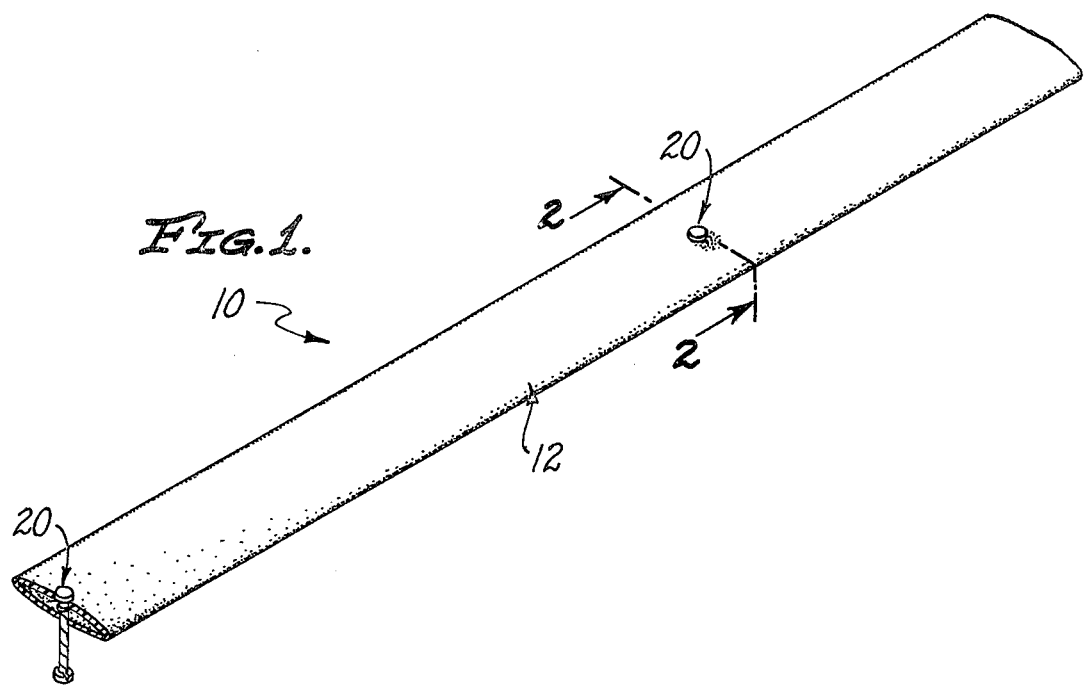
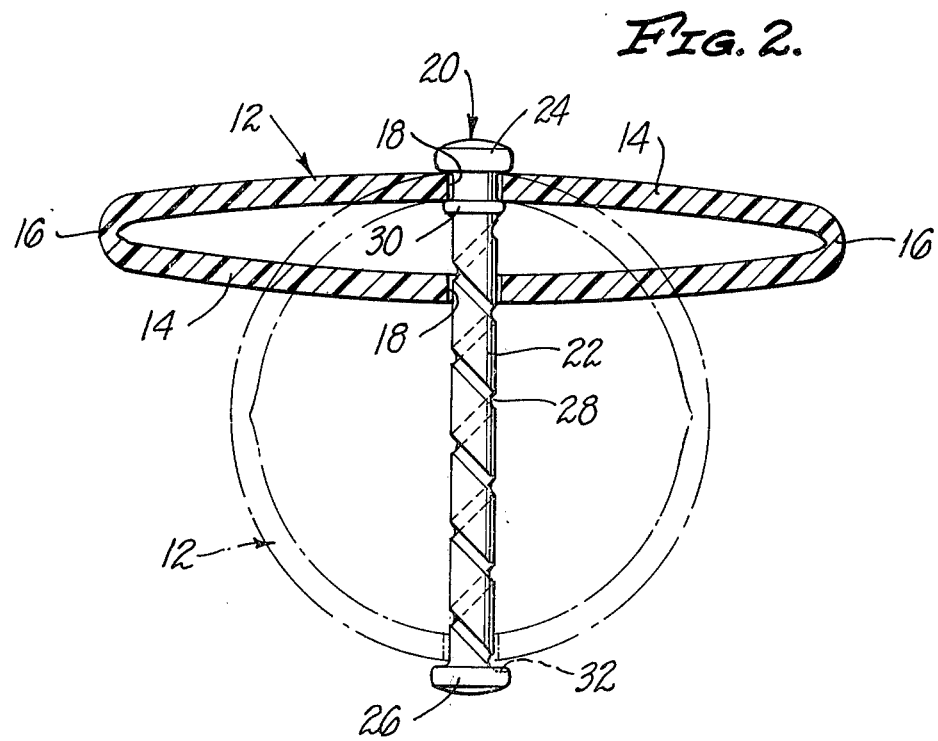

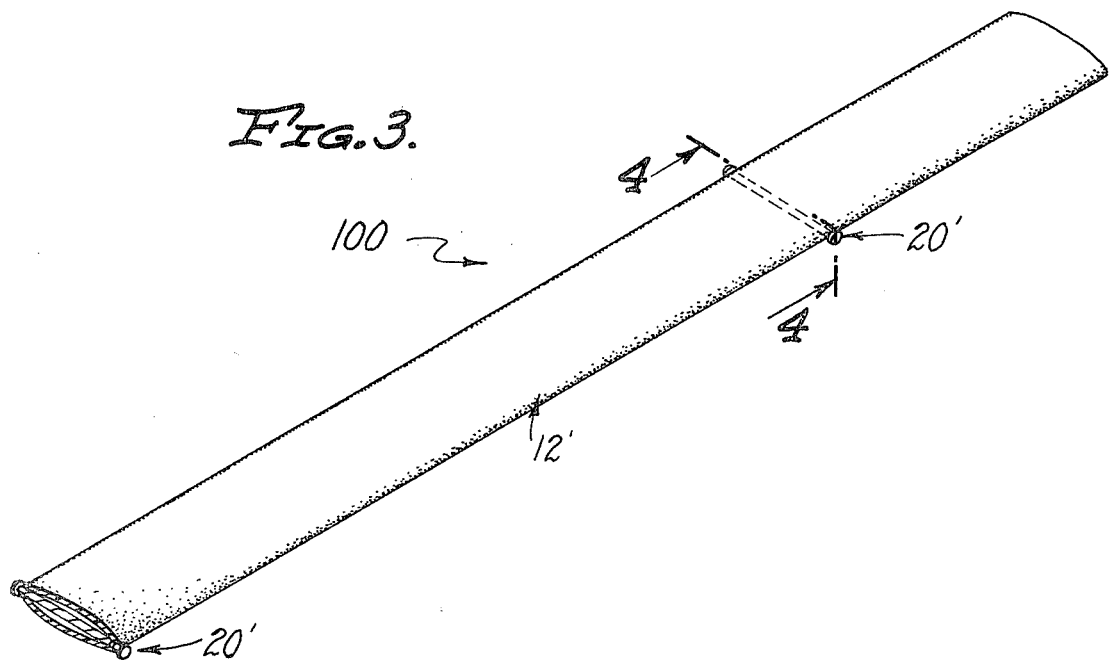
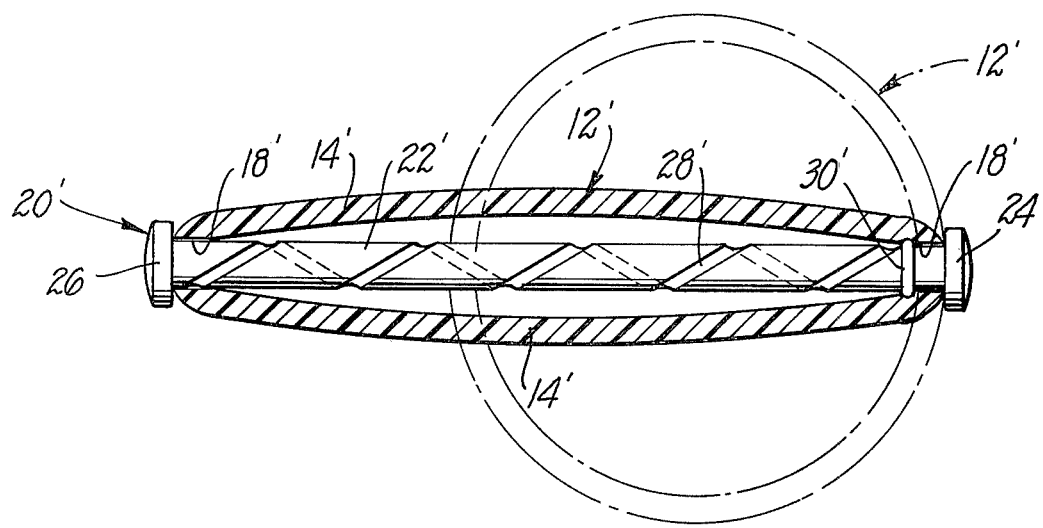

FLUID DISPENSING STRUCTURES

CROSS-REFERENCE TO RELATED APPLICATIONS

This application relates to subject matter which is disclosed and claimed in the co-pending, commonly owned U.S. Pat. application Ser. No. 482,372 entitled "Liquid Distribution Systems" filed June 24, 1974 and subject matter which is disclosed and claimed in the co-pending, commonly owned U.S. Pat. application Ser. No. 481,050 entitled "Fluid Distribution Structures" filed June 20, 1974.

BACKGROUND OF THE INVENTION

The invention set forth in this specification relates to new and improved fluid dispensing structures which are primarily intended to be utilized in drip or trickle type watering or irrigation of plants. It will be recognized, however, that there are many applications in other fields for fluid dispensing structures which are analagous to those structures utilized in watering plants. For this reason this statement of the intended utility of the invention set forth herein is not to be taken as limiting the invention.

Throughout the years many different methods and structures have been used in irrigating various types of plants. At the present time the desirability of so-called "drip" or "trickle" type irrigation is being increasingly recognized. In this type of irrigation, water is conveyed through a tube or conduit and is usually distributed slowly from such a tube or conduit at a rate roughly approximating the rate at which such water is needed to sustain plant growth.

A wide variety of different structures have been developed for distributing water in this manner of irrigation. It is known to utilize various types of porous tubes for this purpose, including tubes which are divided up into sections and which contain eyelets and the like for distributing water. It is also known to utilize various types of "drippers" or "emitters" which are of a valve-like character. On occasion tortuous paths of restricted dimension have been utilized to control the flow of water from a principal tube or conduit. It has also been suggested to utilize wick-type structures to convey water at a limited rate from such a tube or conduit.

It is considered that economics is of primary importance in this field of agricultural watering or irrigation. Unquestionably initial cost considerations have worked against the wide spread utilization of many prior types of drip irrigation structures. Another factor which is quite important in this field is the effectiveness of a particular drip irrigation structure over a prolonged period. It is considered that factors such as sediment accumulation, algae growth and the like have tended to make various prior drip type watering structures unacceptable from a commercial standpoint.

An understanding of the present invention does not require a detailed evaluation of the pros and cons of all of these types of prior drip or trickle type irrigation procedures and structures. The fact that there is an existent need for improvement in the field of the drip-type irrigation is considered to be evidenced by the fact that drip-type irrigation, although used extensively and at an increasing rate, has not materially supplanted various older forms of irrigation such as the use of furrows filled with water, sprinklers and the like.

BRIEF SUMMARY OF THE INVENTION

A broad objective of the present invention is to provide new and improved fluid dispensing structures which are intended to fulfill this need. Thus, the invention is intended to provide structures of this type which overcome various disadvantages and limitations of prior structures in the drip or trickle type irrigation field. Other objectives of this invention are to provide structures of the type indicated which are comparatively inexpensive, which are relatively easy to manufacture, which may be easily utilized, and which are capable of providing relatively prolonged reliable performance. Such structures are intended to distribute relatively controlled and/or metered quantities of a fluid without significant maintenance.

In accordance with this invention these objectives are achieved by providing a fluid dispensing structure which includes: an elongated, flexible, fluid impervious tube or conduit which is capable of changing in cross-sectional configuration in accordance with changes in internal pressure within the tube, this tube having a plurality of holes located along its length, a flow control member associated with each of these holes, these flow control members permitting flow through their associated holes when a fluid is supplied to the interior of the tube.

BRIEF DESCRIPTION OF THE DRAWING

Obviously a summary such as the preceding cannot indicate many significant facets and aspects of the invention such as is set forth in this specification. Further details of this invention are best explained with reference to the accompanying drawing in which:

FIG. 1 is an isometric view of a part of a length of an embodiment of fluid dispensing structure of the present invention;

FIG. 2 is a cross-sectional view taken at line 2—2 of FIG. 1;

FIG. 3 is an isometric view corresponding to FIG. 1 of a presently preferred embodiment of a fluid dispensing structure of the present invention;

FIG. 4 is a cross-sectional view taken at line 4—4 of FIG. 3; and

Figure 5:
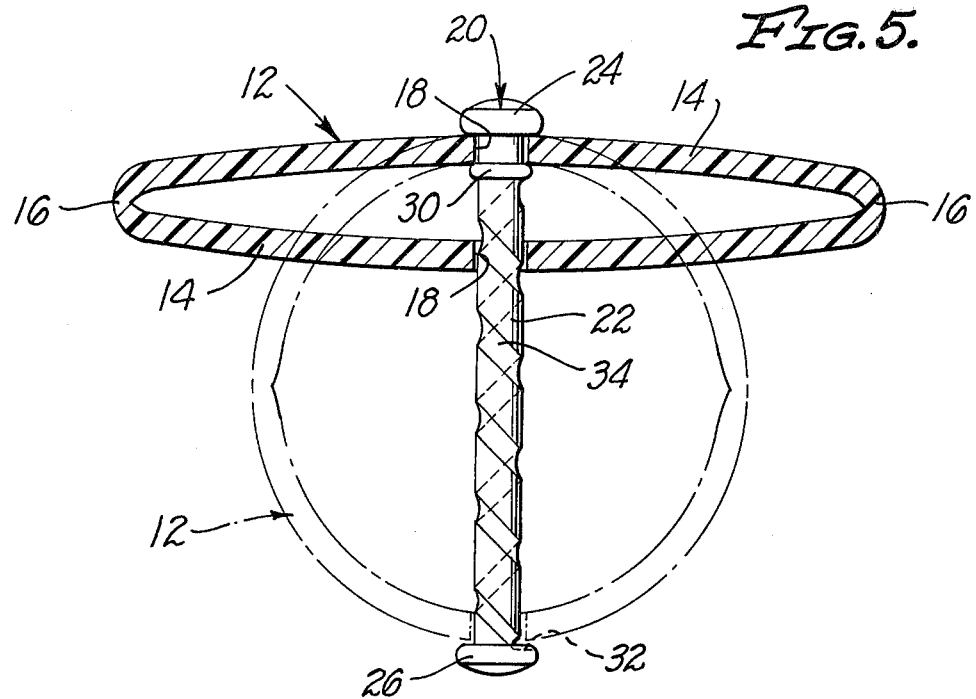
FIGS. 5 and 6 are cross-sectional views corresponding to FIGS. 2 and 4, respectively, showing modified flow control means or members.

In considering the drawings and the remainder of this specification, it is considered that it is necessary to realize that the various different structures specifically illustrated in the drawing utilize various concepts or principles as are set forth in the appended claims. These concepts or principles can be utilized in a number of somewhat differently appearing and differently constructed structures through the use or exercise of routine engineering skill on the basis of the disclosure embodied in this specification.

DETAILED DESCRIPTION

In FIGS. 1 and 2 of the drawing there is shown a liquid distribution structure 10 which consists of an elongated tube or conduit 12 of a flexible, liquid-impervious material. This tube 12 can conveniently be formed at a comparatively nominal cost out of any of a wide variety of different known polymer materials such as polyethylene, various vinyl polymer compositions and the like. As constructed this tube 12 has opposed sides 14 which are connected by walls 16. It is to be understood that the reference to this tube 12 as having these sides 14 and these walls 16 is primarily for convenience of designation.

The particular tube 12 illustrated is capable of being inflated in response to internal fluid pressure so as to have a circular cross-sectional configuration. From this it will be realized that the tube 12 is constructed so as to be capable of changing in cross-sectional configuration in accordance with the internal pressure within the tube. Normally this will require that the sides 14 and that the walls 16 are comparatively thin. In order to encourage the desired type of flexure with the tube 12, the walls 16 may be somewhat thinner than the sides 14.

Throughout the length of the tube 12 spaced sets of aligned circular holes 18 are located within the sides 14 generally midway between the walls 16. Normally the spacing of these holes 18 will be determined with reference to a particular watering application. If desired the spacing between the sets of holes 18 may be varied along the length of the tube 12 so as to compensate for any internal drop in pressure as water flows through the interior of this tube 12 so as to obtain a uniform water distribution at each of identical flow-control members or means 20 associated with the holes 18 of the various sets.

Each flow control means 20 illustrated in FIGS. 1 and 2 of the drawing consists of an elongated member (not seaprately numbered) each of which has an elongated, circular shank 22, one end of which carries an enlarged head 24 and the other end of which is provided with a flanged end or head 26. These heads 24 and 26 of course hold the means in place on the tube 12. Each shank 22 is dimensioned so as to fit closely within the holes 18 in such a manner that both of the sides 14 are capable of moving relative to the shanks 22 in response to a change in the cross-sectional configuration of the tube 12. With the present invention it is preferable to form each shank 22 so that it is of slightly smaller diameter than the holes 18 so that no water will escape around it from within the interior of the tube 12.

It is, however, preferred to form each shank 22 so that it is provided with an external groove 28 which will permit or allow the escape of a relatively controlled amount of fluid from within the interior of the tube 12 when the tube 12 is under pressure. It is possible for the groove 28 to extend straight along the shank 22. However, preferably these grooves 28 are helical and extend around the exteriors of the shanks so that an effective cleaning action as hereinafter explained can be achieved.

Also, it is preferable to form on each shank 22 a peripheral flange 30 which is roughly parallel to and spaced from the head 24. These flanges 30 are designed to be "popped through" a hole 18 of each of the sets of holes 18 so as to tend to hold a side 14 of the tube 12 with respect to the head 24 of each flow control member 20 in such a manner that there can be no relative movement between a side 14 which is so positioned against a head 24 and a flow control member 20.

As the structure 10 is utilized fluid such as water will normally be supplied to the interior of the tube 12 under pressure. This will cause inflation or expansion of this tube 12 so as to move the side 14 of the tube 12 remote from the head 24 on each flow control member 20 outwardly along the length of the shank 22. As this occurs the tube 12 will assume a positon as indicated by phantom lines in FIG. 2. As this inflation occurs water will escape from the interior of the tube 12 through the groove 28 on each flow control means 20.

Also as this inflation occurs there is relative motion between the flow control means 20 and the side 14 which moves in this manner. Such relative motion will result in a wiping action between the hole 18 and the side 14 which is moved and the flow control means 20. This wiping action will tend to dislodge any materials which will tend to accumulate generally in the area of each flow control means 20 and the hole 18 which is moved so as to prevent clogging by any such materials which would tend to interfere with the discharge of fluid adjacent to each of the flow control means 20.

For this action to be achieved, it is preferred that the pitch distance of a groove 28 at least corresponds to the distance that the sides 14 will spread apart as the structure 10 is utilized. It will be further realized that each shank 22 should extend further than this distance in order to avoid any possibility of a shank 22 getting out of an operative position as shown. In order to avoid a wall 14 which moves from hitting against a head 26 so as to tend to form a seal in it, it is preferred to form the head 26 in such a manner as to have a groove or similar irregularity 32 on the surface of this head 26 generally facing the tube 12.

From this it will be apparent that in the structure 10 the shank 22 is of a different cross-sectional configuration than the holes 18. If desired, when the flow control means 20 are used at regular intervals, it is possible to vary the dimensions of the grooves 28 in the different flow control means 20 used so as to compensate for any internal pressure drop within the tube 12 in such a manner as to achieve a substantially equal water distribution at each of the flow control means 20.

Normally the flow control means 20 will be formed out of a metal which is resistant or relatively resistant to corrosion. If desired, however, these flow control means 20 may be formed out of a polymer material. When they are formed out of such a material it is possible to impregnate within such a material a small quantity of one or more known inhibitors for organic growth such as copper naphthenate so as to minimize the growth of algae or fungi at the flow control means 20. Although for economic reasons it is considered that it will not normally be desired, such an inhibitor can be incorporated within the tube 12. Although it will not normally be necessary, it is also possible to incorporate within either the tube 12 or a polymer flow control means 20 a small quantity of a known solid lubricant which will facilitate relative movement between the sides 14 and the shank 22.

When such expedients are used, effective amounts of the agents to cause the desired results must, of course, be employed. The precise quantitative amounts of such agents which will be effective for purposes as indicated will depend upon a number of factors such as the specific agents utilized and the specific polymers present. It is considered that at least 1 percent of an agent as indicated will normally be required to obtain significant results. If too great a percentage of agents as indicated is used the physical strength of a polymer material will be detrimentally effected. The maximum quantities of such agents which can be effectively employed will also vary depending upon the nature of such agents and the polymers used. In general, it is considered that no greater than about 10 percent of the weight of the polymer body should consist of one or more agents as indicated.

When fluid is no longer supplied under pressure to the tube 12, this tube 12 will gradually collapse or similarly change in cross-sectional configuration as fluid from within it escapes from or is metered out from around the flow control means described. The changes in cross-sectional configuration of such a tube will also tend to keep the openings 18 for dispensing a fluid clear by achieving a wiping action.

This manner of operation requires a periodic increase and decrease in the pressure of the fluid supplied to the structure as herein described. Such a change in fluid pressure may be accomplished in any of a variety of ways of a conventional category. Thus, such changes may be caused by manual operation of a valve, pump, or the like. A conventional timing mechanism may also be used.

In FIGS. 3 and 4 of the drawing there is shown a modified liquid distribution structure 100 which is quite similar to the previously described structre 10. In the interest of brevity those parts of the structure 100 which correspond to parts of the structure 10 are not separately identified herein and are designated in the drawing and in the remainder of this specification where necessary for explanatory purposes by the primes of the numerals previously utilized to designate such parts.

The structure 100 differs from the structure 10 solely with respect to the orientation of the flow control means 20' relative to the tube or conduit 12'. In the structure 10 the flow control means 20 was located so as to extend substantially perpendicular to the plane of the tube 12 when this tube 12 is in a collapsed or flattened condition. In the structure 100 the flow control means 20' is oriented so as to extend generally between the walls 16' when the tube 12' is in a flattened or empty configuration. When this tube 12' is in this configuration the shank 22' extends within the walls 14' generally parallel to the planes of these walls 14'. This orientation of a flow control means 20' in the structure 100 is quite important from a commercial standpoint.

While both the structures 10 and 100 can be wound upon an appropriate spool (not shown) when in a collapsed or flattened configuration, for storage and shipment it is much more convenient to wind the structure 100 on such a spool than it is to wind the structure 10 on such a spool. This is because all parts of the structure 100 essentially fit into the same flattened orientation. This permits the structure 100 to be wound on a spool without any significant consideration being given to the locations of the flow control means 20' on such a structure 100. As opposed to this when a structure 10 is wound upon a spool the winding operation must be carefully carried out so that adjacent turns of a structure 10 on such a spool are offset in a way necessary to accommodate the flow control means 20 used on such a structure 10.

The manners of operating the two structures 10 and 100 substantially the same. With structure 100 whenever fluid under pressure is supplied to the interior of the tube 12' this tube 12' will expand, drawing one of the walls 16' along part of the length of the shank 22'. The groove 28' used will operate as in the structure 10 previously described. Thus, with the structure 100 a turning and wiping action serving to permit the release of water or other fluid will be achieved as in the structure 10. When the flow into the interior of the tube 12' prime is cut off this tube will also tend to flatten to its original configuration as fluid is released from within its interior.

During the use of either the structure 10 or the structure 100 the tubes 12 and 12' used with these structures will be inflated an amount corresponding to the pressure of the fluid within the interior of such a tube. When such tubes are extremely long tubes conventional flow control considerations will cause what can be a significant variation in the internal pressures within such a tube along its length. Thus, for example, when one end of such a tube is connected to a source of fluid under pressure such as a pump there will be gradual decrease in the fluid pressure within the tube away from such a source of fluid under pressure. Such a pressure drop along the length of a tube can result in a significant variation in the amount of fluid emitted at various points along the length of a structure 10 or 100. When the tubes 12 or 12' used in the structures 10 or 100, respectively, are comparatively short such variation is only of limited significance, but when these tubes are comparatively long this variation can be of extreme importance.

Figure 6:
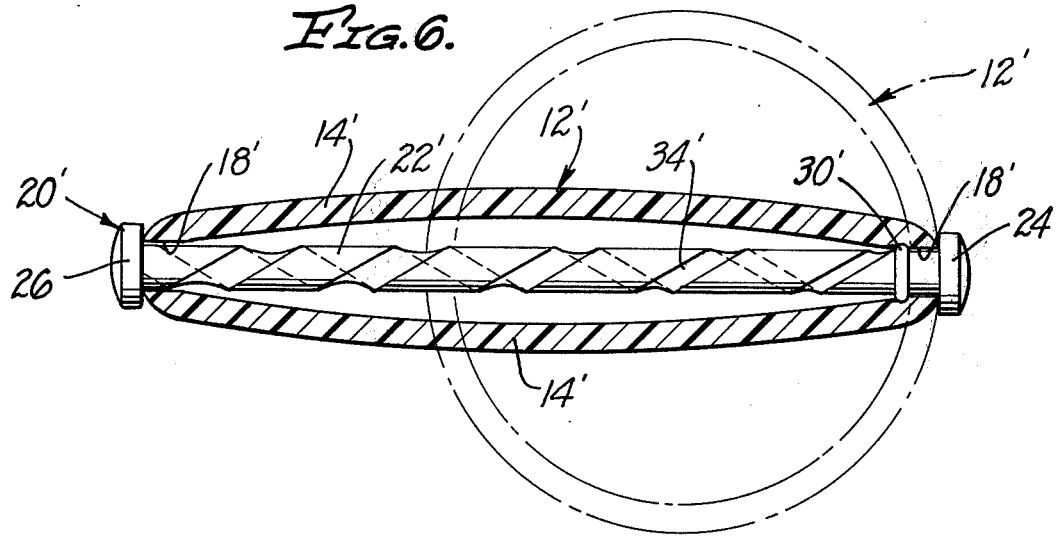

The structures 200 and 300 shown in FIGS. 5 and 6 are intended to compensate for a pressure drop noted in the preceding so that equal or nearly equal quantities of water are distributed along the lengths of tubes as indicated. Since these structures 200 and 300 directly correspond to the structures 10 and 100 previously described except insofar as grooves 34 and 34' are substituted within them for the grooves 28 and 28' previously described only these grooves 34 and 34' are discussed herein. The remainder of the parts in the structures 200 and 300 are designated in the drawing and were necessary for explanatory purposes in this specification by the numerals previously utilized in FIGS. 2 and 4, respectively, in discussing the structures 10 and 100.

In the structure 200 the groove 34 differs from the groove 28 in the structure 10 in that this groove 34 gradually decreases in cross-sectional area from adjacent to the head 24 and the flange 30 so as to have a minimum cross-sectional area adjacent to the head 26. With this construction when the tube 12 is only partially inflated as a result of comparatively low internal perssure a comparatively large amount of water will be emitted from the tube 12. Such a quantity of water will approximate the quantity of water emitted when the tube 12 is inflated to a greater degree as the result of the pressure within the tube 12 being greater.

A similar result is achieved with the structure 300. In this structure 300 the groove 34' replacing the groove 28' is of greater cross-sectional area adjacent to the head 26' and gradually decreases in cross-sectional area towards the head 24' and the flange 30'. Here again the variation in the cross-sectional dimension of the groove 34' is intended to compensate for variation in the internal pressure of fluid within the tube 12' so that substantially equal quantities of fluid are emitted at different points along the length of the tube 12'.

I claim:
1. A fluid dispensing structure which includes:
   an elongated, flexible, fluid impervious tube of an organic polymer material which is capable of changing in cross-sectional configuration between a substantially flat configuration and a circular configuration in accordance with changes in internal pressure within said tube, one end of said tube being adapted to be connected to a source of fluid under pressure, said tube having a plurality of holes located along its length, an elongated flow control member associated with each of said holes, each of said flow control members having a cross-sectional configuration which renders it capable of moving with respect to the hole with which it is associated at all times as said tube changes in cross-sectional configuration between said substantially flat configuration and said circular configuration, each of said flow control members having a cross-sectional configuration different than its associated hole so as to permit flow to the exterior of said tube when a fluid is supplied to the interior of said tube.

2. A fluid dispensing structure as claimed in claim 1 wherein:

there are aligned pairs of said holes located along the length of said tube, each of said flow control members extends through both of the holes of each of said pairs of holes and each of said flow control members includes means for holding it on said tube, said holes and said flow control members being of different cross-sectional configurations.

3. A fluid dispensing structure as claimed in claim 1 wherein:

each of said flow control members includes a shank extending through the hole with which it is associated and means for holding it against movement away from said tube.

4. A fluid dispensing structure as claimed in claim 3 wherein;

said shanks extend generally perpendicular to said tube when said tube is in said flat configuration.

5. A fluid dispensing structure as claimed in claim 3 wherein:

said tube has a generally flat configuration when there is no fluid within the interior of said tube, and said flow control members extend generally parallel to said tube across the interior of said tube when said tube is in said flat configuration.

6. A fluid dispensing structure which includes:

an elongated, flexible, fluid impervious tube which is capable of changing in cross-sectional configuration in accordance with changes in internal pressure within said tube, one end of said tube being adapted to be connected to a source of fluid under pressure, said tube having a plurality of aligned pairs of holes located along the length of said tube, a flow control member associated with each of said aligned pairs of holes, each of said flow control members having a cross-sectional configuration which renders it capable of moving with respect to a hole of the pair of holes with which it is associated as said tube changes in cross-sectional configuration, said flow control members permitting flow through associated holes to the exterior of said tube when a fluid is supplied to the interior of said tube, each of said flow control members has a shank which extends through both of said holes of each of said pairs of holes, said shanks having cross-sectional configurations different than said holes, said shanks having grooves which extend along their lengths a distance corresponding to the maximum inflated cross-sectional configuration of said tube when said tube is filled with a fluid under pressure.

7. A fluid dispensing structure as claimed in claim 6 wherein:

said grooves extend in a helical path around said shanks.

8. A fluid dispensing structure as claimed in claim 7 wherein:

each of said flow control members contains a material capable of inhibiting organic growth.

9. A fluid dispensing structure which includes:

an elongated, flexible, fluid impervious tube which is capable of changing in cross-sectional configuration in accordance with changes in internal pressure within said tube, one end of said tube being adapted to be connected to a source of fluid under pressure, said tube having a plurality of holes located along its length, a flow control member associated with each of said holes, each of said flow control members having a cross-sectional configuration which renders it capable of moving with respect to the hole with which it is associated as said tube changes in cross-sectional configuration, said flow control members permitting flow through their associated holes to the exterior of said tube when a fluid is supplied to the interior of said tube, each of said flow control members includes a shank extending through the hole with which it is associated and means for holding it against movement away from said tube, said shanks have grooves which extend along their lengths a distance corresponding to all positions of said shanks with respect to said holes in said tube during the use of said dispensing structure, said shanks fitting closely within said holes, said grooves varying in cross-sectional dimension so that substantially equal quantities of fluid are emitted at each of said flow control members along the length of said dispensing structure when the pressure of the fluid within said tube differs along the length of said dispensing structure.

10. A fluid dispensing structure as claimed in claim 9 wherein:

each of said grooves is a helical groove extending along the periphery of the shank upon which it is located, the portions of said tube defining said holes fitting against said shanks so as to cause a wiping action relative to said shanks during changes in the cross-sectional configuration of said tube.

11. A fluid dispensing structure which includes:

an elongated, flexible, fluid impervious tube having a cross-sectional configuration which renders it capable of changing in cross-sectional configuration in accordance with changes in internal pressure within said tube, one end of said tube being adapted to be connected to a source of fluid under pressure, said tube having a plurality of holes located along its length, a flow control member associated with each of said holes, each of said flow control members having a cross-sectional configuration which renders it capable of moving with respect to the hole with which it is associated as said tube changes in cross-sectional configuration, said flow control members permitting flow through their associated holes to the exterior of said tube when a fluid is supplied to the interior of said tube, each of said flow control members including a shank extending through the hole with which it is associated and means for holding it against movement away from said tube, said tube has a generally flat configuration when there is no fluid within the interior of said tube, and said shanks extending generally perpendicular to said tube when said tube is in said flat configuration, each of said flow control members including means securing one end of each of said shanks to said tube so that the secured ends of said shanks do not move relative to said tube as said tube changes its cross-sectional dimension, said shanks contain grooves which extend along their lengths, said grooves varying in cross-sectional dimension, said grooves are of larger cross-sectional dimension at the extremities of said shanks adjacent to where said shanks are secured to said tube than at the other extremities of said shanks.

12. A fluid dispensing structure as claimed in claim 11 wherein;

each of said grooves is a helical groove extending along the periphery of the shank upon which it is located, the portions of said tube defining said holes fitting against said shank so as to cause a wiping action relative to said shanks during changes in the cross-sectional configuration of said tube.

13. A fluid dispensing structure which includes:

an elongated, flexible, fluid impervious tube having a cross-sectional configuration which renders it capable of changing in cross-sectional configuration in accordance with changes in internal pressure within said tube, one end of said tube being adapted to be connected to a source of fluid under pressure, said tube having a plurality of holes located along its length, a flow control member associated with each of said holes, each of said flow control members being capable of moving with respect to the hole with which it is associated as said tube changes in cross-sectionl configuration, said flow control members permitting flow through their associated holes to the exterior of said tube when a fluid is supplied to the interior of said tube, each of said flow control members including a shank extending through the hole with which it is associated and means for holding it against movement away from said tube, each of said flow control members including means securing one end of each of said shanks to said tube so that the secured ends of said shanks do not move relative to said tube as said tube changes in cross-sectional dimension, said shanks fitting closely within said holes with which they are associated, said shanks having grooves which extend along their lengths, said grooves varying in cross-sectional dimension, said grooves being of largest cross-sectional dimension at the extremities of said shanks furtherest removed from where said shanks are secured to said tube.

14. A fluid dispensing structure as claimed in claim 13 wherein:

each of said grooves is a helical groove extending along the periphery of the shank upon which it is located, the portions of said tube defining said holes fitting against said shanks so as to cause a wiping action relative to said shanks during changes in the cross-sectional configuration of said tube.

15. A method of operating a fluid dispensing structure having a flexible, fluid impervious tube having a cross-sectional configuration which renders it capable of changing in cross-sectional configuration between a substantially flat configuration and a circular configuration in accordance with changes in internal pressure within said tube, a hole located within said tube and an elongated flow control member associated with said hole and extending through said hole, said flow control member and said hole being in engagement with one another as said tube changes in configuration between said substantially flat configuration and said circular configuration, said hole and control member having different cross-sectional configurations so as to permit a fluid to move from the interior of said tube through said hole around the exterior of said flow control member, which comprises:

changing the internal pressure of fluid within said tube, causing a change in the internal configuration of said tube as a result of said change in pressure, causing relative movement between said flow control member and said hole as a result of said change in internal configuration, removing any accumulation of material which would restrict the flow between said flow control member and said hole by said relative movement.

16. A method as claimed in claim 15 wherein;

said flow control member has a shank extending through said hole and said changes in said cross-sectional configuration cause an alteration of the position of said hole relative to said shank.

17. A method as claimed in claim 16 wherein:

said shank has a helical groove extending along its periphery and said changes in cross-sectional configuration result in a wiping action between said hole and said shank adjacent to said groove.

18. A method of operating a fluid dispensing structure having a flexible tube having a cross-sectional configuration which renders it capable of changing in cross-sectional configuration in accordance with changes in pressure within said tube, said tube having a plurality of holes leading from the interior to the exterior of said tube located so as to be spaced from one another along the length of said tube, said dispensing structure also having a flow control member associated with each of said holes, each of said flow control members including a shank extending through the hole with which it is associated, said shanks having grooves located along their lengths adjacent to said holes, which method comprises:

supplying a fluid under pressure to one end of said tube at a time when said tube is not expanded in cross-sectional configuration to its maximum extent so that said fluid will move along the length of said tube, causing a change in the cross-sectinal configuration of said tube along the length of said tube as the result of said fluid being supplied under pressure, causing relative movement between said flow control members and said holes as a result of said change in cross-sectional configuration, and allowing fluid supplied to flow through said grooves from the interior of said tube through said holes past said flow control members.

19. A method as claimed in claim 18 wherein:

said grooves in said flow control members and said holes are shaped so that the amount of fluid flowing from the interior of said tube is substantially equal at all points along the length of said tube and is independent of the cross-sectional configuration of said tube at said points.

20. A method of operating a fluid dispensing structure having a flexible tube having a cross-sectional configuration which renders it capable of changing in cross-sectional configuration in accordance with changes in pressure within said tube, said tube having a plurality of holes leading from the interior to the exterior of said tube located so as to be spaced from one another along the length of said tube, said dispensing structure also having a flow control member associated with each of said holes, each of said flow control members including a shank, said holes fitting closely around the exteriors of said shanks, said shanks being provided with grooves extending along their lengths through which fluid supplied to the interior of said tube flows from the interior of said tube to the exterior of said tube, said groves varying in cross-sectional dimension, which method comprises:

supplying a fluid under pressure to the interior of one end of said tube when said tube is not expanded in cross-sectional configuration to its maximum extent, allowing the supplied fluid to cause a change in the cross-sectional configuration of said tube along the length of said tube, causing a relative movement between said flow control members and said holes as a result of said change in cross-sectional configuration, allowing fluid supplied to said tube to flow from the interior of said tube through said hole past said flow control members, said flow control members and said holes being shaped so that the amount of fluid flowing from the interior of said tube through said holes past said flow control members is substantially equal at all points along the length of said tube.

21. A method as claimed in claim 20 wherein:

said grooves are helical grooves extending around the exteriors of said shanks.

* * * * *